United States Patent [19]

Sonoda et al.

[11] 4,396,667

[45] * Aug. 2, 1983

[54] ELECTROSTATIC RECORDING MEDIUM

[75] Inventors: Nobuo Sonoda, Settsu; Shigeru Tsubusaki, Hirakata; Wataru Shimotsuma, Ibaraki, all of Japan

[73] Assignee: Matsushita Electric Industrial Company, Limited, Osaka, Japan

[ * ] Notice: The portion of the term of this patent subsequent to Jun. 23, 1998, has been disclaimed.

[21] Appl. No.: 213,600

[22] Filed: Dec. 4, 1980

[30] Foreign Application Priority Data

Dec. 4, 1979 [JP] Japan ............................... 54-157762

[51] Int. Cl.$^3$ ............................................... B32B 3/00

[52] U.S. Cl. ................................... 428/212; 162/138; 346/135.1; 427/121; 428/211; 428/511; 428/514; 428/537

[58] Field of Search ........................ 427/121; 162/138; 346/135.1; 428/537, 212

[56] References Cited

U.S. PATENT DOCUMENTS

| | | | |
|---|---|---|---|
| 3,969,283 | 7/1976 | Timmerman et al. | 260/2 EN |
| 4,173,677 | 11/1979 | Nakano et al. | 428/336 |
| 4,224,396 | 9/1980 | Pollet | 252/62.54 |
| 4,275,103 | 6/1981 | Tsubusaki et al. . | |
| 4,279,961 | 7/1981 | Fujioka et al. | 427/121 |

*Primary Examiner*—George F. Lesmes
*Assistant Examiner*—P. R. Schwartz
*Attorney, Agent, or Firm*—Lowe, King, Price & Becker

[57] ABSTRACT

An electrostatic recording medium comprising a support, a conductive layer formed on one surface of the support and made of zinc oxide dispersed in a combination of a cationic polyelectrolyte and a non-conductive binder resin, and a dielectric layer formed on the conductive layer. The cationic polyelectrolyte is contained in an amount of not smaller than 30% by weight of the total of the polyelectrolyte and the binder resin.

15 Claims, No Drawings

ELECTROSTATIC RECORDING MEDIUM

BACKGROUND OF THE INVENTION

1. Field of the Invention

This invention relates to electrostatic recording media of the type having a double-layer coating formed on a support for use in facsimile or high speed printing.

2. Description of the Prior Art

Typical of known electrostatic recording media are those which comprise a conductive layer which is formed on one surface of a support and has a surface resistivity of $10^5$–$10^{11}\Omega$ and a dielectric layer coated on the conductive layer and made of a dielectric material whose specific resistance is as high as over $10^{12}\Omega\cdot$ cm. Ordinarily employed conductive layers are formed by impregnating electrolytes such as lithium chloride in slick or wood free papers or by coating cationic polyelectrolytes such as high molecular weight quaternary ammonium salts on supports. However, these conductive layers utilizing ion conductivity have drawbacks in that their surface resistivity is greatly influenced by ambient humidity and sharply increases with the relative humidity is below 20%, making it almost impossible to record.

In order to overcome this drawback, there has been proposed a method in which a conductive material having electron conductivity such as cuprous iodide or silver iodide is used as a conductive layer. That is, it is intended to make the recording at low humidity by using the electron-conductive material without undergoing any influence of ambient humidity. However, these materials undesirably assume color and have such an unfavorable property that since the electron conductivity results from an excess of iodine, the iodine is released when an electrostatic latent image is developed and then fixed by application of heat.

Various improvements have been proposed including methods in which conductive zinc oxide is used instead of the conductive metal halide materials and is applied onto a support by use of hydrophobic binders to give a conductive layer (Japanese Laid-Open Application Nos. 51-25140 and 54-126029) and a method using copper iodide and zinc oxide in combination as a conductive layer (Japanese Laid-Open Application No. 54-126835).

However, all of these improved methods have the drawback that the recording density is lowered when the ambient humidity exceeds about 75% R.H. Presumably, this is because the conductive particles in the conductive layer deteriorate in electric contact when a support or base grows by absorption of moisture, thus increasing the surface resistivity.

In order to further improve these methods, we have already proposed in our copending U.S. application No. 054,901, filed July 5, 1979, now U.S. Pat. No. 4,275,103, an electrostatic recording medium which makes use of a conductive layer made of a conductive metal oxide semiconductor and an organic binder including a polyelectrolyte. This medium has an excellent dissolving power and an excellent moisture-resistant characteristic. The reason why the moisture-resistant characteristic is excellent is considered to be as follows: The ion conductivity of the polyelectrolyte contributes to maintenance of the surface resistivity even under high humidity conditions where the electric contact of the conductive particles tends to deteriorate. In this connection, however, zinc oxide which is advantageous from the viewpoint of economy and whiteness over other metal oxide semiconductors, still has a problem that the surface resistivity of the zinc oxide conductive layer becomes unstable as time goes.

SUMMARY OF THE INVENTION

It is an object of the present invention to provide an electrostatic recording medium which comprises a zinc oxide conductive layer and which shows a stable surface resistivity over a long period and an excellent moisture-resistant characteristic.

It is another object of the invention to provide an electrostatic recording medium in which a cationic polyelectrolyte is used in combination with ZnO whereby an excellent dissolving power is ensured.

It is a further object of the invention to provide an electrostatic recording medium which is advantageous in economy and has a high degree of whiteness.

The above objects can be achieved by an electrostatic recording medium which comprises a support, a conductive layer coated on one surface of the support and substantially composed of zinc oxide dispersed in a combination of not smaller than 30% but not greater than 95% by weight of a cationic polyelectrolyte and the balance a non-conductive resin, and a dielectric layer formed on the outer surface of the conductive layer.

A prominent feature of the invention is that the binder in which zinc oxide is dispersed is made of a combination of a cationic polyelectrolyte and a synthetic resin whereby the surface resistivity of the conductive layer is held stable as time goes and shows an excellent moisture-resistant or surface resistivity characteristic.

EMBODIMENTS OF THE INVENTION

Conductive zinc oxide useful in the present invention has a specific resistance ranging from $10^0$ to $10^6\Omega\cdot$ cm when its powder is pressed at a pressure of about 71 kg/cm$^2$. The specific resistance is preferably below about $10^4\Omega\cdot$ cm in view of cost and electric characteristics and above $10^3\Omega\cdot$ cm in view of the degree of whiteness. The conductive zinc oxide having the specific resistance mentioned above can be prepared by any known technique including treatment in a hydrogen-reducing furnace by which oxygen-deficient conductive zinc oxide can be obtained by an impurity-doping technique in which a small amount of an impurity such as $Al_2O_3$, $Ga_2O_3$ or $In_2O_3$ is deposited on zinc oxide in a wet or dry manner and then diffused in a furnace to form impurity-doped or valence-controlled zinc oxide. When $Al_2O_3$-doped zinc oxide is used, the amount of $Al_2O_3$ to be doped is in the range of 0.2–0.4 mole% so as to satisfy the above-mentioned range of the preferable specific resistance. The zinc oxide is used in the form of a fine powder and is dispersed in a binder in an amount of 50 to 95% by weight of the total composition for the conductive layer as is well known in the art.

The binder, which is another component of the conductive layer, is made of a combination of a cationic polyelectrolyte and a synthetic organic resin as described above.

The cationic polyelectrolytes suitable for the purpose of the invention are oligomers or polymers which have the following functional group of the formula (a)

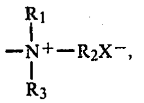

(a)

in which each $R_1$, $R_2$ and $R_3$ are independently hydrogen, an alkyl group, an allyl group, an aryl group, an acyl group, or an alkylamino group, and X is a halogen. Specific examples of the cationic polyelectrolytes having the functional group of the formula (a) include polyvinylbenzyltrimethylammonium chloride, partial ester products of polyacrylic acid containing quaternary ammonium salts such as SC-101 (product of Sanyokasei Ind. Co., Ltd.), poly-2-vinyl-N-methylpyridinium chloride and the like, and other polyelectrolytes such as polyethyleneimine chloride. The cationic polyelectrolytes having a functional group of the following general formula (b)

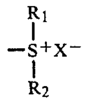

(b)

in which $R_1$ and $R_2$ have the same meanings as defined above may also be used in the present invention and include, for example, poly-2-acrylooxyethyldimethylsulfonium chloride, polyvinylbenzylsulfonium chloride, and the like. Further, cationic polyelectrolytes having a functional group of the formula (c)

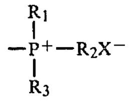

(c)

in which $R_1$, $R_2$ and $R_3$ have the same meanings as defined above, respectively, may be likewise used and include, for example, polyvinylbenzylphosphonium chloride, polyglycidyltrimethylphosphonium chloride and the like. Of these, polyvinylbenzyltrimethylammonium chloride, partial ester products of acrylic polymer containing quaternary ammonium salts, and polyethyleneimide are preferable due to their excellence in electric stability over a prolonged period when applied as a conductive layer in the medium.

The cationic polyelectrolytes are used in an amount of not smaller than 30% by weight but not greater than 95% by weight of the total amount of the binder composition, which may vary depending on the types of the cationic polyelectrolyte and synthetic resin used. Preferably, the amount is not smaller than 50% by weight of the composition and most preferably about 70% by weight of the composition. Smaller amounts are unfavorable since the ion conductivity of polyelectrolytes does not develop satisfactorily and the moisture-resistant characteristic becomes poor.

Larger amounts than 95 wt% are disadvantageous in that the binder composition can not serve satisfactorily as a binder for zinc oxide powder and the layer formed from such a composition deteriorates in its moisture-resistant characteristic, thus leading to deteriorated recording characteristics.

The cationic polyelectrolytes may further include pyridinium chloride or trimethylammonium bromide incorporated in nonionic binders such as polyvinyl alcohol or hydroxyethyl cellulose.

The non-conductive binder resin which is used in combination with the cationic polyelectrolyte can be broadly classified into two categories including hydrophobic resins such as vinyl acetate resin, styrene-butadiene resin and acrylic ester resin which are used in the form of an aqueous emulsion, and water-soluble resins such as polyvinyl alcohol and hydroxyethyl cellulose. In view of the stability of the surface resistivity, the hydrophobic resins are preferable to the water-soluble resins as will be particularly illustrated in examples. Similarly, vinyl acetate resin is preferable among the hydrophobic resins.

In the practice of the invention, the non-conductive resin is used in an amount of at least 5% by weight of the binder composition. Amounts less than 5 wt% will lead to deterioration of the moisture-resistive characteristic.

In view of the foregoing, preferable combinations of the cationic polyelectrolyte and the non-conductive resin include polyvinylbenzyltrimethylammonium chloride or partial ester products of acrylic polymer having a quaternary ammonium salt therein and vinyl acetate resin.

The dispersion of zinc oxide powder in the binder composition is applied onto a support such as a paper or plastic sheet in an amount of 7–25 g/m$^2$, preferably 10–15 g/m$^2$, as is known in the art. When a zinc oxide powder of a higher specific resistance is used, the coating amount becomes larger. In this sense, the specific resistance of zinc oxide should be below $10^6 \Omega \cdot$ cm.

The dielectric layer formed on the conductive layer may be formed from a solution of a dielectric resin material such as polyester dissolved in an organic solvent as is well known.

The present invention will be particularly described by way of examples.

EXAMPLE 1

Several types of conductive zinc oxide fine powders as shown in Table 1 were used.

TABLE 1

| ZnO No. | Amount of doped $Al_2O_3$ (mole %) | Specific Resistance at 25° C. ($\Omega \cdot$ cm) |
|---|---|---|
| 1 | 0.1 | $8.1 \times 10^4$ |
| 2 | 0.2 | $9.5 \times 10^3$ |
| 3 | 0.3 | $1.4 \times 10^3$ |
| 4 | 0.4 | $7.0 \times 10^2$ |

From the above table, it will be appreciated that when the amount of the $Al_2O_3$ is increased, the specific resistance decreases but the doped zinc oxide has an increasing tendency for assuming a bluish color.

100 parts by weight of the ZnO powders were milled and dispersed in aqueous solutions of binder compositions in amount of 20 parts by weight as solids to give conductive paints. The binder compositions had a cationic polyelectrolyte to non-conductive resin ratio of 7:3 on a weight basis. For comparison, an anionic polyelectrolyte and cationic polyelectrolytes were used singly to disperse the ZnO powder (No. 3) to prepare paints. In this case, each polyelectrolyte was used in an amount of 20 parts by weight per 100 parts by weight of zinc oxide.

Each paint was coated on a slick paper by means of a wire bar and dried to form a conductive layer, on which was further applied a paint of a composition shown in Table 2 in an average thickness of 3–4 μm by means of a wire bar, followed by drying to form a dielectric layer.

TABLE 2

| Material | Composition (parts by weight) |
|---|---|
| Linear polyester (Biron of Toyobo Co., Ltd.) | 100 |
| Dichloroethane | 100 |
| Chlorobenzene | 300 |

The thus obtained electrostatic recording media were each subjected to a measurement of surface resistivity before and after having allowed a sample to stand for 1000 hours in an atmosphere of 20° C. and 60% R.H., with the results shown in Table 3. In Table 3, $\rho_{s1000}/\rho_{sO}$ is a ratio of a surface resistivity measured after the standing to that prior to the standing. The binders used are abbreviated as follows:

PVAc: Emulsion of polyvinyl acetate (Movinyl of Hoechst A. G.)
SC-101: Partial ester of an acrylic acid polymer having quaternary ammonium salt (SC-101 of Sanyo Kasei Ind. Co., Ltd.)
ECR: Polyvinylbenzyltrimethylammonium chloride (ECR of Dow Chemical Co.)
2-VP: Poly-2-vinyl-N-methylpyridinium chloride
EIC: Polyethyleneimine chloride
AEMS: Poly-2-acrylooxyethyldimethylsulfonium chloride
SBR: Aqueous emulsion of styrene-butadiene copolymer (Danbond of Nippon Zeon Co., Ltd.)
PVA: Polyvinyl alcohol (PVA-205 of Kurare Co., Ltd.)
HEC: Hydroxyethyl cellulose (WP-09L of Union Carbide Corp.)
AEP-1: Sodium polystyrenesulfonate (AEP-1 of Arakawa Chem Co., Ltd.)

TABLE 3

| Test No. | Type of ZnO | Coated Amount of conductive layer ($g/m^2$) | Binder | $\rho_{s1000}/\rho_{s0}$ |
|---|---|---|---|---|
| Inventive Media | | | | |
| 1 | No. 3 | 12 | SC-101 + PVAc | 1.5 |
| 2 | No. 3 | 12 | ECR + PVAc | 2.0 |
| 3 | No. 1 | 25 | " | 2.7 |
| 4 | No. 2 | 14 | " | 2.5 |
| 5 | No. 4 | 13 | " | 2.6 |
| 6 | No. 3 | 13 | ECR + SBR | 3.0 |
| 7 | No. 3 | 15 | ECR + PVA | 5.0 |
| 8 | No. 3 | 12 | ECR + HEC | 4.5 |
| Comparative Media | | | | |
| 9 | No. 3 | 7 | 2-VP | 6.9 |
| 10 | No. 3 | 9 | EIC | 6.7 |
| 11 | No. 3 | 8 | AEMS | 7.5 |
| 12 | No. 3 | 10 | AEP-1 | 123 |

All the samples were tested in an electrostatic recording facsimile (Panafax 1200 made by Matsushita Graphic Communication Systems, Inc.), with the results that practically usable recorded matters could be obtained under humidity conditions ranging from 2% R.H. to 95% R.H. in all the cases immediately after the preparation of the media.

However, the results of the above table revealed:

(1) As for stability of the surface stability, the medium using the anionic polyelectrolyte (AEP-1) showed a greatly increased surface resistivity after 1000 hours which was 123 times as great as an initial one and thus no recording was feasible. This is because in the case of the anionic binder, sodium cations to be dissociation ions are reached with ZnO and the conductive surface layer is broken by diffusion of the impurities.

(2) The combinations of the cationic polyelectrolytes and the hydrophobic resins as a binder (Test Nos. 1–6) are well-balanced in view of the coating amount and the stability of the surface resistivity. On the other hand, the use of the cationic polyelectrolytes alone (Test Nos. 9–11) is disadvantageous in that the surface resistivity shows variations of 6.7–7.5 times as much and is thus relatively unstable though the coating amount is sufficient to be as small as 7–9 $g/m^2$. As compared with combinations of the polyelectrolytes with the water-soluble resins, the combinations with the hydrophobic resins are better. This is considered to occur since the binder is composed of a water soluble resin and there is a tendency that the conductive particles are moved by absorption of moisture with the passage of time.

(3) As shown in Table 3, when the specific resistance of conductive zinc oxide is below $1\times10^4\Omega\cdot$ cm, a coating amount is sufficient to be below 14 $g/m^2$ and in the case of a specific resistance of $8\times10^4\Omega\cdot$ cm, an amount of 25 $g/m^2$ is necessary. Accordingly, the specific resistance of the conductive zinc oxide fine powder is preferably below $1\times10^4\Omega\cdot$ cm. On the other hand, zinc oxide is desired to be as high in degree of whiteness as possible so as to impart a high degree of whiteness to the medium. To this end, zinc oxide has preferably a specific resistance of above $1\times10^3\Omega\cdot$ cm. The medium using zinc oxide No. 4 is observed to assume a slight degree of blue coloration.

(4) When comparing the polyvinyl acetate and the styrenebutadiene copolymer with each other, both of which are hydrophobic resins used in the form of an aqueous emulsion, the former resin which is rather hydrophilic, appears to have a greater stabilizing effect.

EXAMPLE 2

Example 1 was repeated but using zinc oxide No. 3 and a combination of ECR and PVAc in different ratios, with the results shown in Table below.

TABLE 4

| Test No. | Coating amount of conductive layer | ECR:PVAc ratio by weight | $\rho_{s1000}/\rho_{s0}$ |
|---|---|---|---|
| 1 | 12 | 100:0 | 5.3 |
| 2 | " | 95:5 | 4.8 |
| 3 | " | 90:10 | 4.5 |
| 4 | " | 70:30 | 2.0 |
| 5 | " | 50:50 | 2.6 |
| 6 | " | 30:70 | 3.8 |
| 7 | " | 20:80 | 5.6 |
| 8 | " | 0:100 | 9.3 |

From the results, it will be seen that the surface resistivity is relatively stable at a ratio ranging from 30:70 to 95:5.

With regard to the $\rho_{s1000}/\rho_{sO}$ ratio, the binder composition having an ECR:PVAc ratio outside the range defined in the present invention may be usable but it was found that when ECR was used in amounts greater than 95 wt% the binding property and the moisture-resistant or surface resistivity characteristic of the conductive layer were deteriorated. On the other hand, less amounts than 30 wt% of ERC were undesirable since the moisture-resistant characteristic became poor.

What is claimed is:

1. An electrostatic recording medium comprising a support, a conductive layer coated on one surface of said support, said conductive layer consisting essentially of zinc oxide dispersed in a combination of not less than 30% but not greater than 95% by weight of a cationic polyelectrolyte, with the balance being a non-conductive resin, and a dielectric layer formed on the conductive layer.

2. An electrostatic recording medium according to claim 1, wherein said cationic polyelectrolyte is an oligomer or polymer having a functional group of the formula

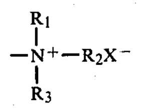

where $R_1$, $R_2$ and $R_3$ are independently hydrogen, an alkyl group, an allyl group, an aryl group, an acyl group, or an alkylamino group, and X is a halogen.

3. A electrostatic recording medium according to claim 2, wherein said oligomer or polymer having the functional group is polyvinylbenzyltrimethylammonium halide or a partial ester of an acrylic acid polymer containing a quaternary ammonium salt.

4. An electrostatic recording medium according to claim 1, wherein cationic polyelectrolyte is poly-2-vinyl-N-methylpyridinium chloride or polyethyleneimine chloride.

5. An electrostatic recording medium according to claim 1, wherein said cationic polyelectrolyte has a functional group of the formula

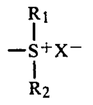

in which $R_1$ and $R_2$ are independently hydrogen, an alkyl group, an allyl group, an aryl group, an acyl group or an alkylamino group, and X is a halogen.

6. An electrostatic recording medium according to claim 5, wherein said cationic polyelectrolyte is poly-2-acrylooxyethyldimethylsulfonium chloride or polyvinylbenzylsulfonium chloride.

7. An electrostatic recording medium according to claim 1, wherein said cationic polyelectrolyte has a functional group of the formula

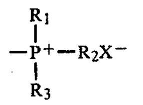

in which $R_1$, $R_2$ and $R_3$ are independently hydrogen, an alkyl group, an allyl group, an aryl group, an acyl group or an alkylamino group, and X is a halogen.

8. An electrostatic recording medium according to claim 7, wherein said cationic polyelectrolyte is polyvinylbenzylphosphonium chloride or polyglycidyltrimethylphosphonium chloride.

9. An electrostatic recording medium according to claim 1, wherein said non-conductive resin is a hydrophobic resin or a water soluble resin.

10. An electrostatic recording medium according to claim 9, wherein said hydrophobic resin is polyvinyl acetate, styrene-butadiene resin or acrylic ester resin.

11. An electrostatic recording medium according to claim 9, wherein said water-soluble resin is polyvinyl alcohol or hydroxymethyl cellulose.

12. An electrostatic recording medium according to claim 1, wherein said combination is a combination of polyvinylbenzyltrimethylammonium halide or a partial ester of acrylic acid polymer containing a quaternary ammonium salt polyvinyl acetate.

13. An electrostatic recording medium according to claim 1, wherein said zinc oxide has a specific resistance ranging from $1\times10^3$ to $1\times10^4\Omega\cdot$ cm.

14. An electrostatic recording medium according to claim 1, wherein the amount of the cationic polyelectrolyte is not smaller than 50 wt% of the combination.

15. An electrostatic recording medium according to claim 14, wherein the amount is about 70 wt%.

* * * * *